Nov. 13, 1923.

C. R. NICHOLS 1,473,969

CONCRETE PIPE MAKING MACHINE

Filed July 21, 1922  5 Sheets-Sheet 1

Inventor
C. R. Nichols
By L. B. James
Attorney

Nov. 13, 1923.

C. R. NICHOLS

CONCRETE PIPE MAKING MACHINE

Filed July 21, 1922  5 Sheets-Sheet 2

1,473,969

Inventor
C. R. Nichols
By L. B. James
Attorney

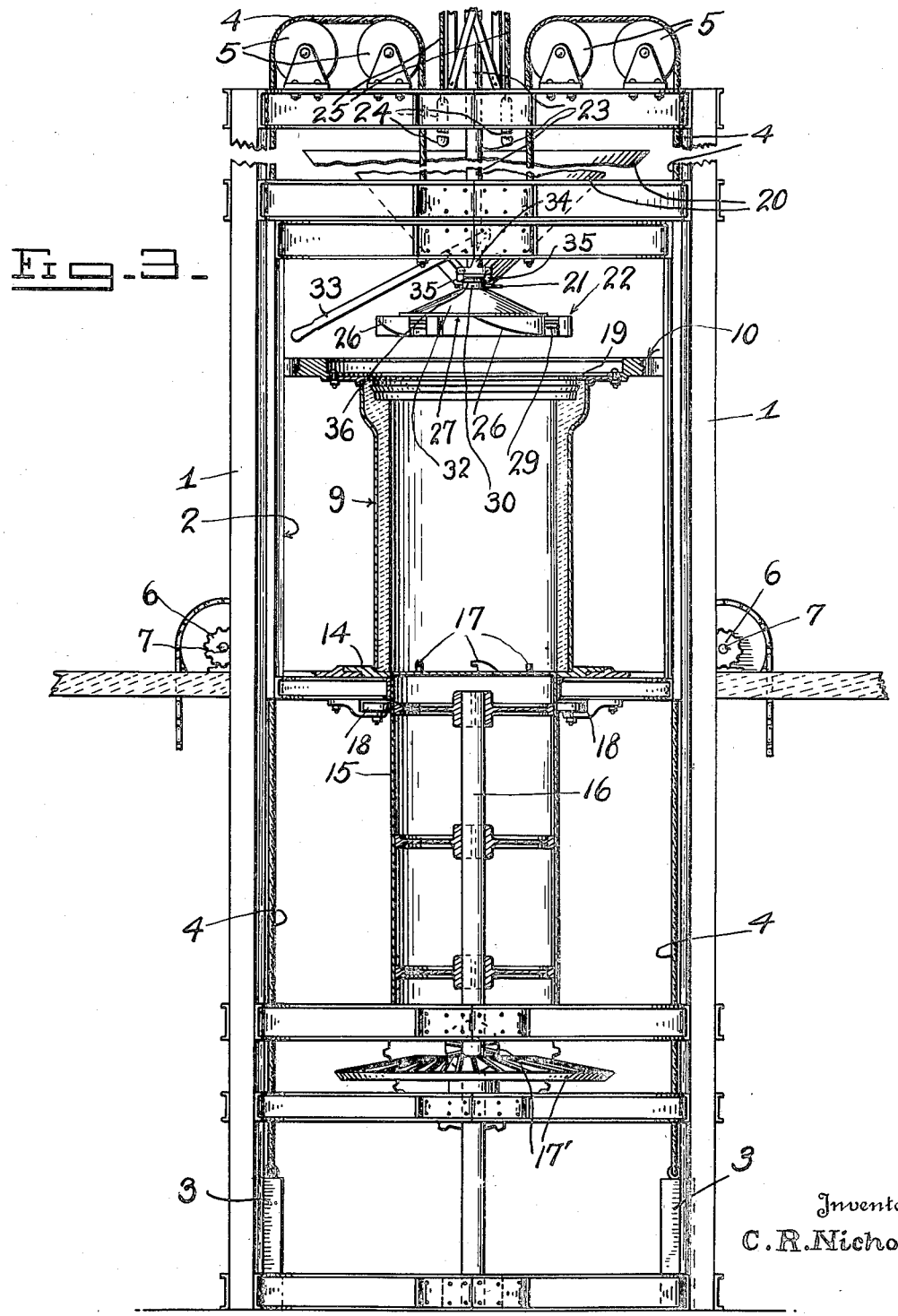

Nov. 13, 1923.
C. R. NICHOLS
CONCRETE PIPE MAKING MACHINE
Filed July 21, 1922    5 Sheets-Sheet 4
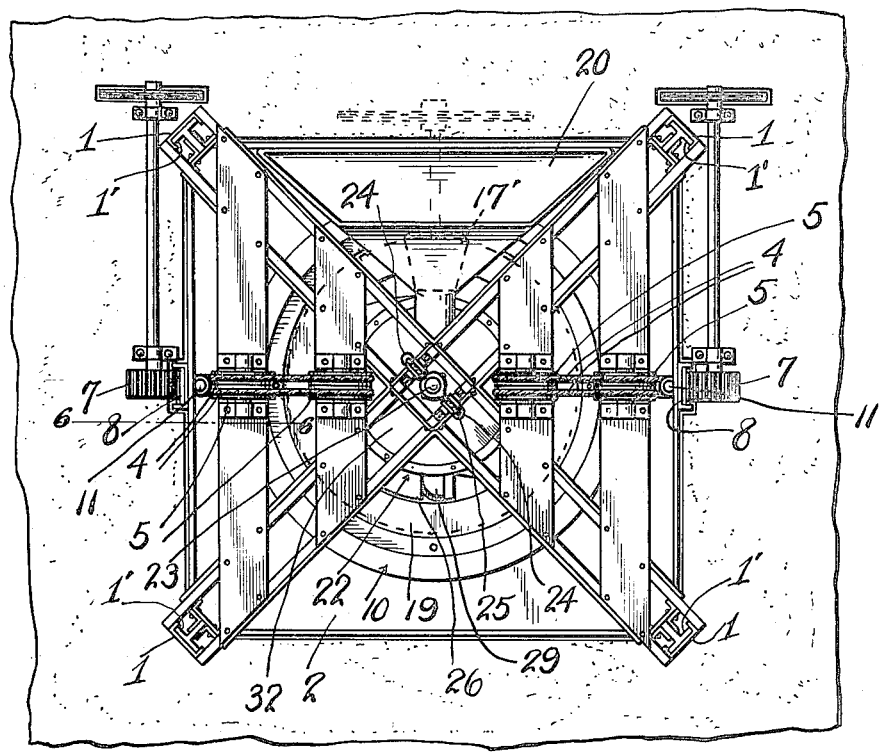
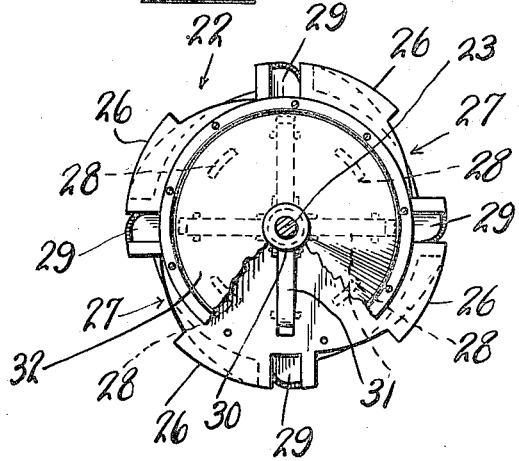
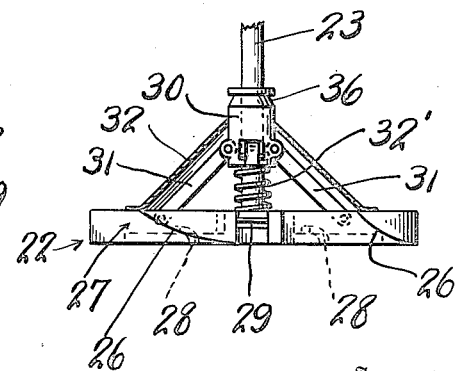
Inventor
C. R. Nichols
By L. B. James
Attorney Nov. 13, 1923.
C. R. NICHOLS
1,473,969
CONCRETE PIPE MAKING MACHINE
Filed July 21, 1922    5 Sheets-Sheet 5
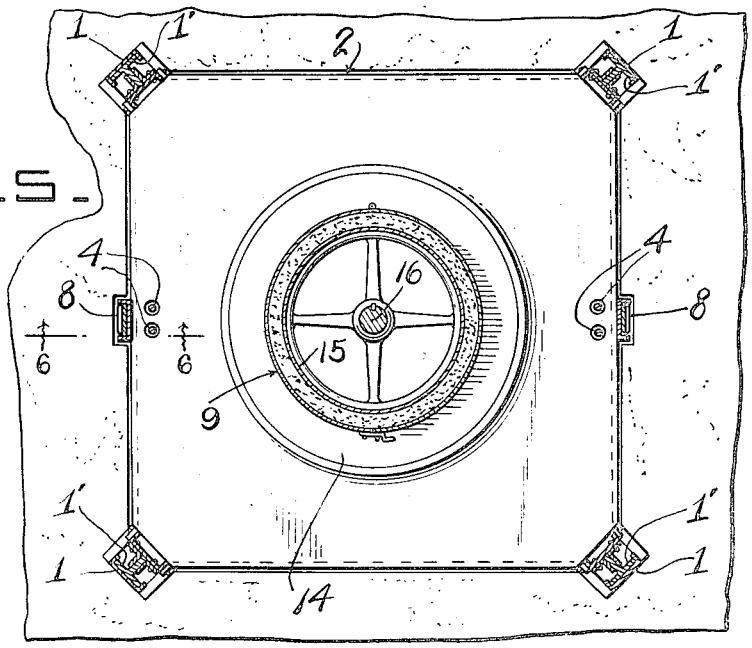
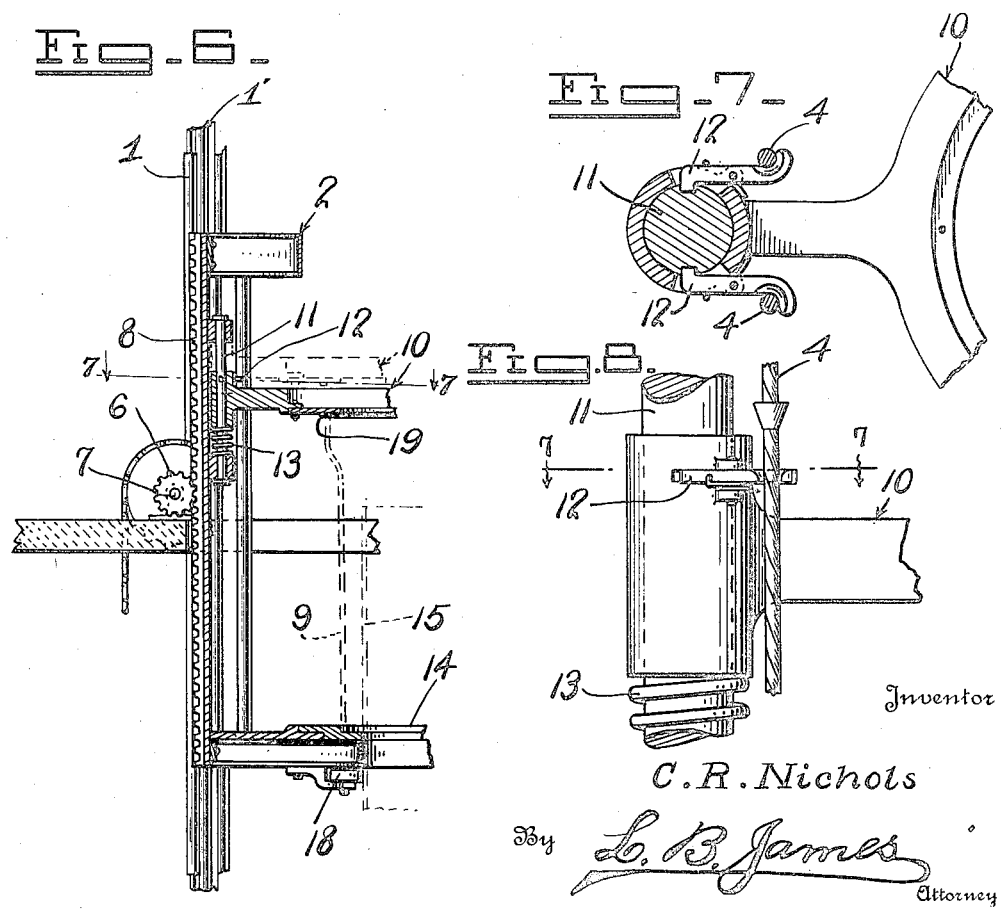
Inventor
C. R. Nichols
By L. B. James
Attorney Patented Nov. 13, 1923.

1,473,969

UNITED STATES PATENT OFFICE.

CLIFFORD R. NICHOLS, OF DALLAS, TEXAS.

CONCRETE-PIPE-MAKING MACHINE.

Application filed July 21, 1922. Serial No. 576,405.

*To all whom it may concern:*

Be it known that I, CLIFFORD R. NICHOLS, a citizen of the United States, residing at Dallas, in the county of Dallas and State of Texas, have invented new and useful Improvements in Concrete-Pipe-Making Machines, of which the following is a specification.

This invention relates to a machine for forming pipes from concrete and the like, the general object of the invention being to form a pipe having a bell end which is provided with an annular space and a calking lip.

Another object of the invention is to provide a rotary drum which forms the inside member of the mold and a rotary head which is detachably connected with the drum and which is provided with compression flanges which compress the material between the drum and the outside member of the mold.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a similar view but showing the parts in still another position.

Figure 4 is a plan view.

Figure 5 is a section on line 5—5 of Figure 1.

Figure 6 is a section on line 6—6 of Figure 4.

Figure 7 is a section on line 7—7 of Figure 6.

Figure 1:
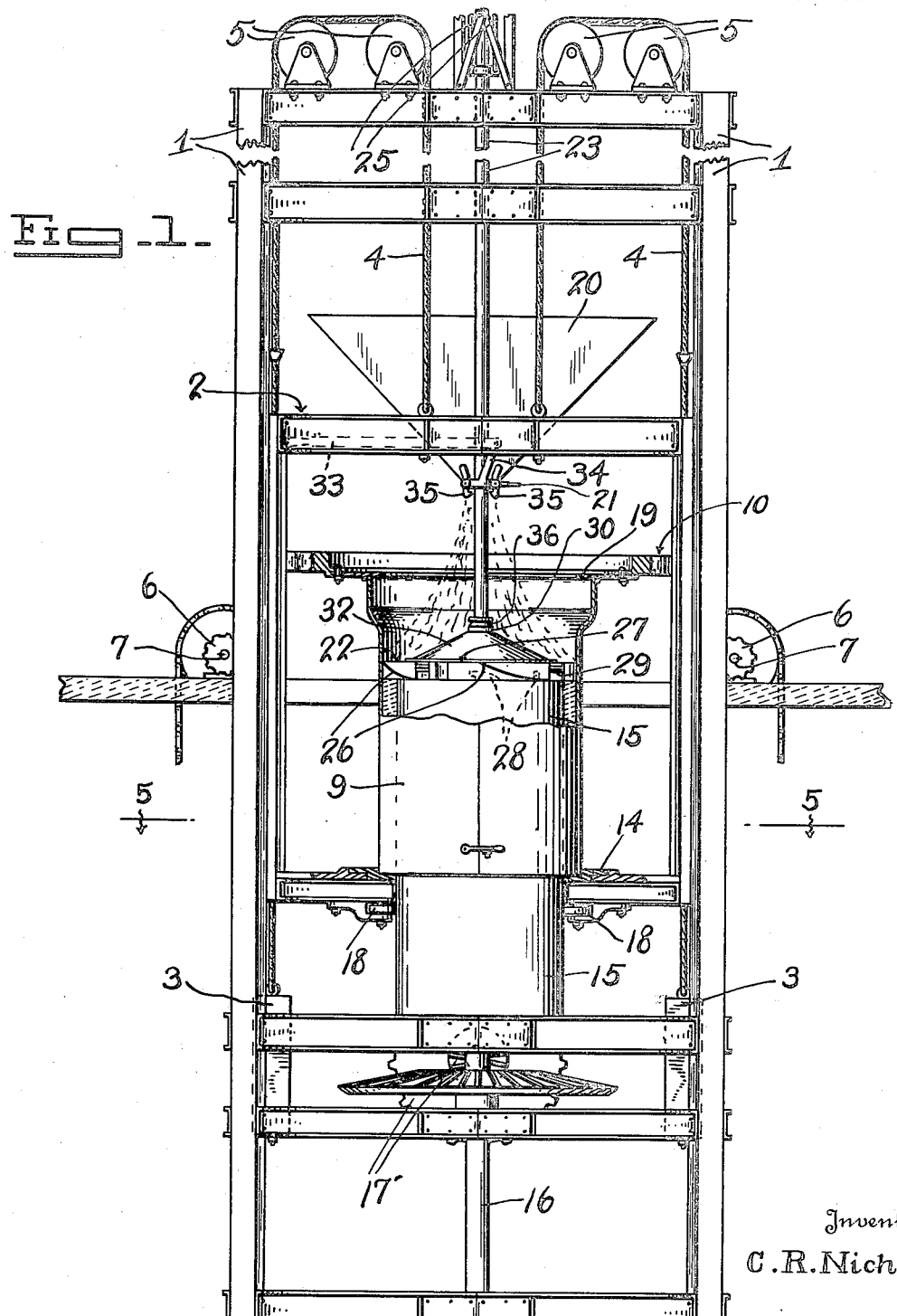
Figure 1 is a view, partly in section, of the invention showing the parts in one position.

The remaining figures are detail views.

In these views 1 indicates the main frame which is shown as being of rectangular shape and consisting of upright members and brace members. The upright members include track parts 1' which are engaged by parts of a cage 2 which is vertically movable in the frame. This cage is also shown as of rectangular shape and is counter-balanced by the weights 3 which are attached to the top of the cage by the cables 4, said cables passing over the pulleys 5 on the top of the frame. This cage is also adjusted in the frame by means of the sprockets 6 carried by the shafts 7, suitably supported in the frame and driven by any suitable means, and engaging racks 8 on the cage. A two-part jacket 9 is supported on the bottom of the cage and has its upper end detachably connected to a pan 10 which is movably supported on the post 11, forming part of the cage, catches 12 holding the pan in engagement with the jacket against the action of springs 13 on the post which tend to raise the pan to a point adjacent the top of the cage so that the completed pipe can be removed. The two parts of the jacket are locked together by any suitable means. The jacket rests upon a movable part 14 which forms part of the bottom of the cage, this part having an opening therein for receiving the cylinder 15 which is mounted on the shaft 16 journaled in the frame and which is driven from any suitable source of power through the gears 17'. The top of the cylinder is closed and this top carries the hooks 17 for a purpose to be hereinafter described. The bottom of the cage carries rollers 18 for engaging the cylinder to steady the same in its rotation. This cylinder forms the inner member of the mold. The upper part of the jacket flares outwardly to form the bell end of the pipe, the pan being provided with the flange 19 which projects beyond the end of the flared part of the jacket to form the ends of the pipe. The top of the cage carries a hopper 20 for delivering the concrete into the mold, the passage of material from the hopper to the mold being controlled by a gate 21. A rotary head 22 is connected with the lower end of a shaft 23, these parts being counter-balanced by the weights 24 which are connected with the upper end of the shaft by the cables 25. Said head includes the adjustable compression flanges 26 for compressing the material in the mold, the openings 27 through which the material passes into the mold, the sockets 28 for receiving the hooks 17 on the top of the cylinder which connect the head with the cylinder and the lip forming members 29 which are contracted and expanded by the movable collar 30 which is connected with said member by the links 31. A spring 32' tends to hold the collar in its upper position with the parts of the head contracted. The working parts of the head are covered by the cone-shaped cover 32 which acts to direct the material dropping from the hopper into the openings 27. A hand lever 33 has a part 34 thereon for engaging the collar for depressing the same and hooks 35 are also connected with said lever for engaging a groove 36 in the collar for raising the head into the position shown in Figure 3.

Figure 2:
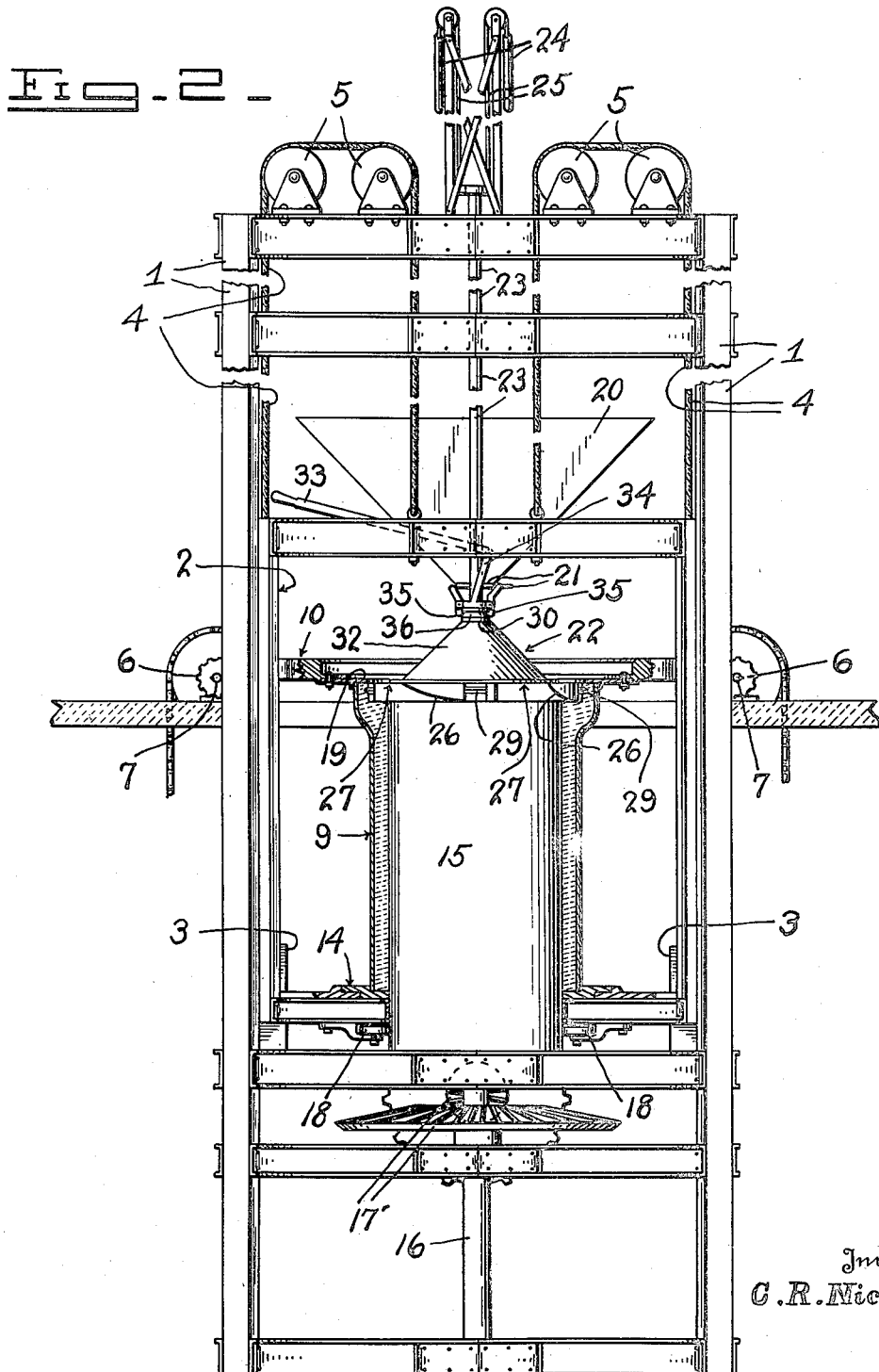
Figure 2 is a similar view but showing the parts in another position.

With the parts in a position shown in Figure 3 the jacket 9 is placed upon the base and firmly held in position by the pan 10 which is held in engagement with the top of the jacket by the catches 11. The rotary head is then lowered and connected with the cylinder by the hooks 17. Power is then applied to shaft 16 to rotate the cylinder and the head. Gate 21 is then opened to permit the concrete in the hopper to drop into the mold. This concrete will pass through the openings in the head and it will be firmly compressed between the rotating cylinder and the jacket by the flanges 26 of the head. As the walls of the pipe are built up the pressure from the head gradually forces the cage down until it reaches the position shown in Figure 2. A suitable bumper may be provided for limiting the downward movement of the cage. The operator then moves lever 33 from the position shown in Figure 1 to that shown in Figure 2 so as to exert pressure upon the collar to force the same downwardly against the action of its spring and thus expand the parts of the head to form the annular space and calking lip in the bell end of the pipe, as shown in Figure 2. When the pressure is released on the lever 33 the spring will cause the parts of the head to assume their original positions and during this operation the hooks 35 will have engaged the groove in the collar and when lever 33 is moved into the position which it occupies in Figure 3 the rotary head is raised out of engagement with the pipe. The cage is then elevated to its position of starting by the racks and sprockets, the catches of the pan are released so as to permit the springs to raise the same and then the jacket parts are removed from the pipe so as to permit the pipe to be removed from the apparatus. The cylinder not only compresses the material but it also burnishes the interior of the pipe and thus renders it suitable for almost any service. The material is packed by the flanges and by centrifugal force.

It is thought from the foregoing description the advantages and novel features of my invention will be readily apparent.

I desire it to be understood that I may make changes in the construction and in the combination and arrangement of the several parts, provided that such changes fall within the scope of the appended claims.

What I claim is:—

1. An apparatus of the class described comprising a supporting frame, a vertically movable cage in the frame, a cylinder forming the inner member of a mold, means for rotating the cylinder, a jacket forming the outer member of the mold detachably supported by the cage and a molding head detachably connected with the top of the cylinder so as to rotate therewith and having compression flanges for compressing the material in the mold.

2. An apparatus of the class described comprising a supporting frame, a vertically movable cage therein, a jacket supported by the cage and forming the outer member of the mold, a cylinder forming the inner member of the mold, means for rotating the same, a head detachably connected with the top of the cylinder so as to rotate therewith, molding flanges on the head and means for expanding and contracting parts of the head to form a calking lip on the pipe.

3. An apparatus of the class described comprising a supporting frame, a vertically movable cage therein, a jacket removably carried by the cage and forming the outer member of the mold, a cylinder forming the inner member of the mold, means for rotating the cylinder, a head detachably connected with the top of the cylinder so as to rotate therewith, said head having openings therein through which the material passes into the mold, compression flanges on the head, movable parts on the head for forming the annular space and calking lip in the bell end of the pipe and manually operated means for expanding and contracting said movable parts.

4. An apparatus of the class described comprising a supporting frame, a cage vertically movable therein, a sectional jacket removably supported in the cage and forming the outer member of the mold, an adjustable pan engaging the top of the jacket, a cylinder forming the inner member of the mold, means for rotating the same, a rotary head detachably connected with the top of the cylinder, compression flanges on the head, movable parts on the head for forming the annular space and the calking lip in the bell end of the pipe and manually operated means for adjusting such parts.

5. An apparatus of the class described comprising a supporting frame, a vertically movable cage in the frame, manually operated means for adjusting the cage in the frame, counter-balanced weights for the cage, an outer member of the mold supported by the cage, a revolving cylinder forming the inner member of the mold, a head detachably connected with the top of the cylinder and having compression flanges thereon, means permitting the head to be raised and lowered and counter-balanced weights connected with the head.

In testimony whereof I affix my signature.

CLIFFORD R. NICHOLS.